(12) United States Patent
Wei et al.

(10) Patent No.: US 7,255,831 B2
(45) Date of Patent: Aug. 14, 2007

(54) TUNGSTEN OXIDE/TITANIUM DIOXIDE PHOTOCATALYST FOR IMPROVING INDOOR AIR QUALITY

(75) Inventors: Di Wei, Manchester, CT (US); Timothy N. Obee, South Windsor, CT (US); Stephen O. Hay, South Windsor, CT (US); Thomas H. Vanderspurt, Glastonbury, CT (US); Wayde R. Schmidt, Pomfret Center, CT (US); Joseph J. Sangiovanni, West Suffield, CT (US)

(73) Assignee: Carrier Corporation, Syracuse, NY (US)

( * ) Notice: Subject to any disclaimer, the term of this patent is extended or adjusted under 35 U.S.C. 154(b) by 725 days.

(21) Appl. No.: 10/449,752

(22) Filed: May 30, 2003

(65) Prior Publication Data

US 2004/0241040 A1    Dec. 2, 2004

(51) Int. Cl.
*A61L 9/00* (2006.01)
(52) U.S. Cl. .................. 422/4; 204/158.2; 313/112; 313/573; 422/24; 422/186.3
(58) Field of Classification Search .......... 422/24, 422/186.3; 204/158.2; 313/112, 573
See application file for complete search history.

(56) References Cited

U.S. PATENT DOCUMENTS

| 6,135,838 A | 10/2000 | Wang |
| 6,136,186 A | 10/2000 | Gonzalez-Martin |
| 6,308,611 B1 | 10/2001 | Simonds |
| 6,797,127 B1* | 9/2004 | Murata et al. ............ 204/158.2 |
| 2002/0024278 A1* | 2/2002 | Matsuda et al. ............ 313/112 |
| 2002/0077251 A1 | 6/2002 | Okusako et al. |

FOREIGN PATENT DOCUMENTS

| EP | 1199103 | 4/2002 |
| WO | WO 03/037509 | 5/2003 |

OTHER PUBLICATIONS

Do et al., The Effect of WO3 on the Photocatalytic Activity of TiO2, Journal of Solid State Chemistry, Jun. 1, 1993, pp. 198-201, Academic Press, Inc.

(Continued)

*Primary Examiner*—Krisanne Jastrzab
(74) *Attorney, Agent, or Firm*—Carlson, Gaskey & Olds

(57) ABSTRACT

A tungsten oxide/titanium dioxide photocatalyst coating oxidizes contaminants in the air that adsorb onto the coating into water, carbon dioxide, and other substances. The tungsten oxide forms a monolayer on the titanium dioxide. When photons of the ultraviolet light are absorbed by the tungsten oxide/titanium dioxide photocatalyst coating, an electron is promoted from the valence band to the conduction band, producing a hole in the valence band. The holes in the valence band react with water applied on the tungsten oxide/titanium dioxide photocatalyst coating, forming reactive hydroxyl radicals. When a contaminant in the air is adsorbed onto the tungsten oxide/titanium dioxide photocatalyst, the hydroxyl radical attacks the contaminant, abstracting a hydrogen atom from the contaminant. The hydroxyl radical oxidizes the contaminant, producing water, carbon dioxide, and other substances. The tungsten oxide/titanium dioxide photocatalytic coating has low sensitivity to humidity variations.

27 Claims, 5 Drawing Sheets

OTHER PUBLICATIONS

Zhao et al., Photocatalytic Oxidation for Indoor Air Purification: A Literature Review, Building and Environment, Oct. 9, 2003, pp. 645-654, Elsevier Science Ltd.

Papp et al., Surface Acidity and Photocatalytic Activity of TiO2, WO3/TiO2, and MoO3/TiOx Photocatalysts, Chem. Mater., Jan. 14, 1994, pp. 496-500, vol. 6, No. 4, American Chemical Society.

Lee et al., Effect Au and WO3 on the Surface Structure and Photocatalytic Activity of TiO2, Korean Chemical Society, Mar. 11, 1997, pp. 667-670, vol. 18, No. 6.

Fuerte, A. et al. "Nanosize Ti-W Mixed Oxides: Effect of Doping Level in the Photocatalytic Degradation of Toluene Using Sunlight-Type Excitation," Journal of Catalysis, vol. 212, 2002, pp. 1-9, XP002303426.

International Search Report, Nov. 18, 2004.

* cited by examiner

TUNGSTEN OXIDE/TITANIUM DIOXIDE PHOTOCATALYST FOR IMPROVING INDOOR AIR QUALITY

BACKGROUND OF THE INVENTION

The present invention relates generally to an air based tungsten oxide/titanium dioxide photocatalyst that oxidizes gaseous contaminants in the air that adsorb onto the photocatalytic surface to form carbon dioxide, water, and other substances.

Indoor air can include trace amounts of contaminants, including volatile organic compounds such as formaldehyde, toluene, propanal, butene, and acetaldehyde. Absorbent air filters, such as activated carbon, have been employed to remove these contaminants from the air. As air flows through the filter, the filter blocks the passage of the contaminants, allowing contaminant free air to flow from the filter. A drawback to employing filters is that they simply block the passage of contaminants and do not destroy them.

Titanium dioxide has been employed as a photocatalyst in an air purifier to destroy contaminants. When the titanium dioxide is illuminated with ultraviolet light, photons are absorbed by the titanium dioxide, promoting an electron from the valence band to the conduction band, thus producing a hole in the valence band and adding an electron in the conduction band. The promoted electron reacts with oxygen, and the hole remaining in the valence band reacts with water, forming reactive hydroxyl radicals. When a contaminant adsorbs onto the titanium dioxide photocatalyst, the hydroxyl radicals attack and oxidize the contaminants to water, carbon dioxide, and other substances. A drawback to the titanium dioxide photocatalyst of the prior art is that it has limited reactivity. Additionally, humidity can greatly affect the photocatalytic performance of the titanium dioxide and therefore the oxidation rate of the contaminants.

Metal oxide/titanium dioxide photocatalysts have been employed as a water-phase photocatalyst to remove contaminants from a water flow. Water phase chemistry is significantly different from air phase chemistry. The reaction mechanisms are in general different in each phase. Therefore, a catalyst designed for aqueous phase chemistry does not perform in the same manner as a catalyst designed for gas phase chemistry. Additionally, the hydroxyl radical can diffuse away from the photocatalyst surface in an aqueous phase, and the hydroxy radical does not diffuse away from the photocatalyst surface in the gas phase. Finally in the water phase, the water and ionic species in the water compete with the contaminants for adsorption sites on the photocatalyst, also reducing the photocatalytic performance.

Sol-gel coating processes have been employed to create a photocatalytic suspension that is applied to a substrate to create a photocatalytic coating. The sol-gel coating process achieves the desired photocatalytic loading and high adhesion performance through multiple dip coating processes. A drawback to the sol-gel coating process is that it requires expensive titanium precursors (such as titanium isopropoxide) and complicated reflux/sonication procedures. Therefore, the sol-gel coating process is costly and labor intensive.

Hence, there is a need for an air-based photocatalyst for oxidizing contaminants having an increased reactivity, a lower sensitivity to humidity variations, and a cost effective process to coat the photocatalyst to a substrate.

SUMMARY OF THE INVENTION

A tungsten oxide/titanium dioxide photocatalyst coating on a substrate such as a honeycomb, purifies the air in a building or a vehicle by oxidizing any contaminants in the air that adsorb onto the coating to water, carbon dioxide, and other substances.

A fan draws air into an air purification system. The air first flows through a particle filter that filters out dust or any other large particles. The air then flows through an open passage or channel of a honeycomb. The surface of the honeycomb is coated with a tungsten oxide/titanium dioxide photocatalytic catalyst. An ultraviolet light source positioned between successive honeycombs activate the tungsten oxide/titanium dioxide photocatalyst coating. The walls of the air purification system are preferably lined with a reflective material to reflect the ultraviolet light onto the interior surface of the open passages of the honeycomb.

When photons of the ultraviolet light are absorbed by the tungsten oxide/titanium dioxide photocatalyst coating, an electron is promoted from the valence band to the conduction band, producing a hole in the valence band. The electrons in the conduction band are captured by oxygen. The holes in the valence band react with water that is adsorbed on the tungsten oxide/titanium dioxide photocatalyst coating, forming reactive hydroxyl radicals.

The tungsten oxide forms a monolayer on the titanium dioxide. When a contaminant in the air is adsorbed onto the tungsten oxide/titanium dioxide photocatalyst coating, the hydroxyl radical attacks the contaminant, abstracting a hydrogen atom from the contaminant and oxidizing the contaminants to water, carbon dioxide, and other substances. The tungsten oxide/titanium dioxide photocatalyst coating has a low sensitivity to humidity. Therefore, humidity has a much lower effect on the photocatalytic activity of the tungsten oxide/titanium dioxide photocatalyst as compared to the titanium dioxide photocatalyst of the prior art.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
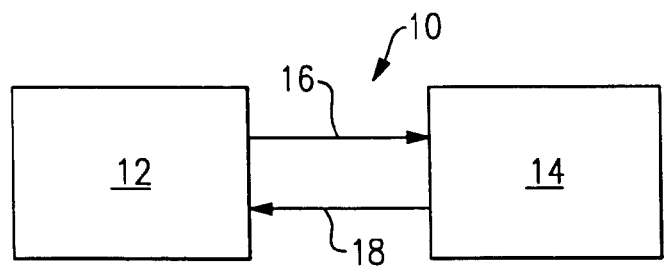
FIG. 1 schematically illustrates an enclosed environment, such as a building, vehicle or other structure, including an interior space and an HVAC system.

FIG. 1 schematically illustrates a building, vehicle, or other structure 10 including an interior space 12, such as a room, an office or a vehicle cabin, such as a car, train, bus or aircraft. An HVAC system 14 heats or cools the interior space 12. Air in the interior space 12 is drawn by a path 16 into the HVAC system 14. The HVAC system 14 changes the temperature of the air drawn 16 from the interior space 12. If the HVAC system 14 is operating in a cooling mode, the air is cooled. Alternately, if the HVAC system 14 is operating in a heating mode, the air is heated. The air is then returned back by a path 18 to the interior space 12, changing the temperature of the air in the interior space 12.

Figure 2:
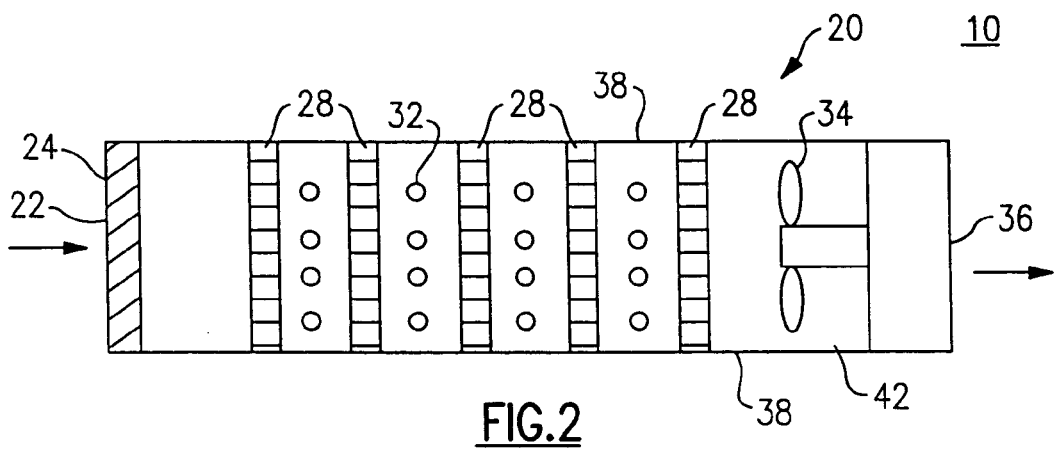
FIG. 2 schematically illustrates the air purification system of the present invention.

FIG. 2 schematically illustrates an air purification system 20 employed to purify the air in the building or vehicle 10 by oxidizing contaminants, such as volatile organic compounds, in the air to water, carbon dioxide, and other substances. The contaminants can be an oxidizable species such as carbon monoxide or a reducible species such as ozone. For example, the contaminants can be a volatile organic compound or semi-volatile organic compound such as toluene, propanal, butene or acetaldehyde. The contaminants can also be aldehydes, ketones, alcohols, aromatics, alkenes, or alkanes. The air purification system 20 can purify air before it is drawn along path 16 into the HVAC system 14 or it can purify air leaving the HVAC system 14 before it is blown along path 18 into the interior space 12 of the building or vehicle 10. The air purification system 20 can also be a stand alone unit that is not employed with a HVAC system 14.

Figure 3:
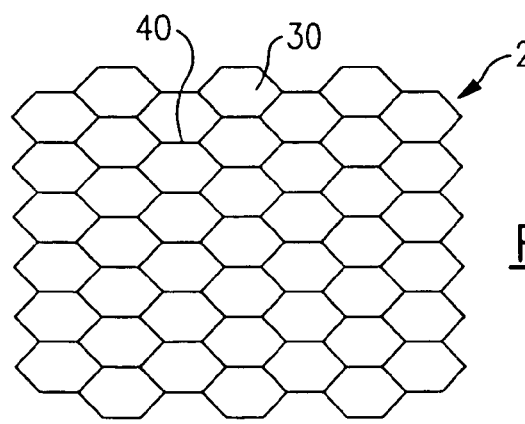
FIG. 3 schematically illustrates the honeycomb of the air purification system.

A fan 34 draws air into the air purification system 20 through an inlet 22. The air flows through a particle filter 24 that filters out dust or any other large particles by blocking the flow of these particles. The air then flows through a honeycomb 28. In one example, the honeycomb 28 is made of aluminum or an aluminum alloy. FIG. 3 schematically illustrates a front view of the honeycomb 28 having a plurality of hexagonal open passages or channels 30. The surfaces of the plurality of open passages 30 are coated with a tungsten oxide/titanium dioxide ($WO_3/TiO_2$) photocatalytic coating 40 that oxidizes contaminants that adsorb onto the tungsten oxide/titanium dioxide photocatalytic coating 40 when activated by ultraviolet light. As explained below, as air flows through the open passages 30 of the honeycomb 28, contaminants in the air that are adsorbed on the surface of the tungsten oxide/titanium dioxide photocatalytic coating 40 are oxidized into carbon dioxide, water and other substances.

Preferably, the photocatalyst is titanium dioxide. In one example, the titanium dioxide is Millennium titania, Degussa P-25, or an equivalent titanium dioxide. However, it is to be understood that other photocatalysts can be employed. For example, the photocatalyst can also be ZnO, CdS, $SrTiO_3$, $Fe_2O_3$, $V_2O_5$, $SnO_2$, $FeTiO_3$, or PbO. Additionally, tungsten oxide is preferably employed as the coating. However, it is to be understood that other metal oxides can be employed as the coating. For example, the metal oxide can be ZnO, CdS, $SrTiO_3$, $Fe_2O_3$, $V_2O_5$, $SnO_2$, $FeTiO_3$, PbO, and combinations thereof. These metal oxides can also be combined with a metal additive such as gold, silver, palladium, platinum, and ruthenium.

A light source 32 positioned between successive honeycombs 28 activates the tungsten oxide/titanium dioxide photocatalytic coating 40 on the surface of the open passages 30. As shown, the honeycombs 28 and the light source 32 alternate in the air purification system 20. That is, ultraviolet lights 32 are located between each of the honeycombs 28. Preferably, the light source 32 is an ultraviolet light source which generates light having a wavelength in the range of 180 nanometers to 400 nanometers.

The purified air then exits the air purifier through an outlet 36. The walls 38 of the air purification system 20 are preferably lined with a reflective material 42. The reflective material 42 reflects the ultraviolet light onto the surface of the open passages 30 of the honeycomb 28.

Removal of contaminants with a device characterized by a low pressure drop is disclosed in copending provisional patent application Ser. No. 60/474,638, filed on May 29, 2003, and entitled "Gas Phase Contaminants Removal with Low Pressure Drop," the disclosure of which is incorporated by reference in its entirety.

Figure 4A:
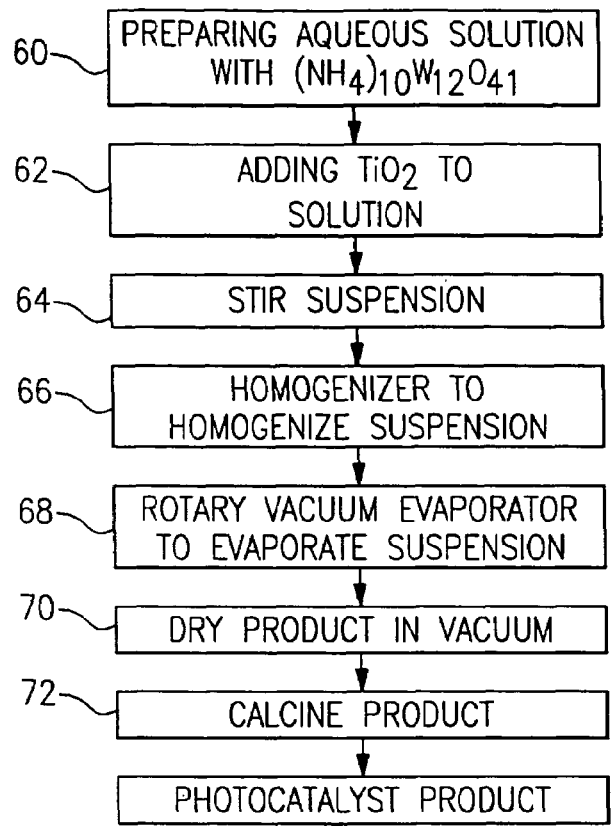
FIG. 4a schematically illustrates a flowchart of the process of making a photocatalytic product.

FIG. 4a schematically illustrates a flowchart of the method of preparing a tungsten oxide/titanium dioxide photocatalyst. An aqueous solution containing approximately 1.0-3.0 mg/ml of ammonium paratungstate (($NH_4)_{10}W_{12}O_{41}$) is prepared. Preferably, the solution contains approximately 2.0 mg/ml of ammonium paratungstate. A fixed weight of titanium dioxide 62 is added and dispersed in the ammonium paratungstate solution to form a suspension.

The resulting suspension is stirred 64 overnight and then homogenized for approximately 10-30 minutes by employing a homogenizer 66 with a dispersing generator. In one example, the suspension is homogenized at a speed of 7500 rpm, and the dispersing generator has a diameter of 30 mm and 15 slots.

A drying device 68, such as a rotary vacuum evaporator, evaporates the resulting suspension to dryness. The product is then further dried over night in a vacuum 70 at a temperature between 60-80° C. Preferably, the product is dried at a temperature of 70° C.

The product is then calcined 72 by heating the product at a rate of 1-5° C. per minute to a temperature between 350-500° C. in the presence of either air or flowing an oxygen and argon gas mixture. Preferably, the product is heated at a rate of 1.5° C. per minute. The product is preferably heated to a temperature of 450° C. as this temperature offers a slightly higher photocatalytic activity. Once the desired temperature is reached, the temperature is maintained for approximately 0.5-3 hours. Preferably, the temperature is maintained for one hour. In the presence of oxygen, the calcination decomposes the ammonium paratungstate to tungsten oxide, water, and ammonia.

Figure 4B:
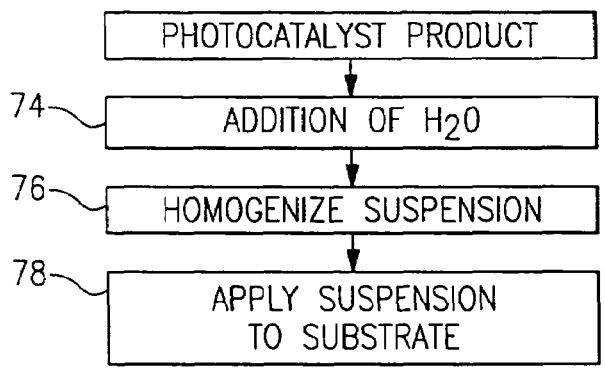
FIG. 4b schematically illustrates a flowchart of the process of applying the photocatalytic product to a substrate.

FIG. 4b schematically illustrates a flowchart of the method of applying the photocatalytic product to a substrate. As an example, the resultant tungsten oxide/titanium dioxide powder is added to distilled water 74 to make a 25 wt % aqueous suspension. The suspension is then homogenized 76 for 10-30 minutes by using the homogenizer with the dispersing generator at a speed of 7500 rpm. The resulting tungsten oxide/titanium dioxide slurry is then applied 78 to the surface of the honeycomb 28. Preferably, the honeycomb 28 is pre-cleaned with acetone and methanol to remove dirt and oil and clean the surface to enhance adhesion of the applied coating to the honeycomb 28.

The suspension is applied to the surface of the honeycomb 28 by spraying, electrophoresis, dip coating. After the suspension is applied, the suspension is allowed to dry, forming a uniform tungsten oxide/titanium dioxide photocatalytic coating 40 on the honeycomb 28.

The homogenizing process has a significant effect on the performance of the tungsten oxide/titanium dioxide photocatalytic coating 40. It is suggested that the shear forces generated by the homogenizer 66 break the large tungsten oxide/titanium dioxide agglomerates into much smaller particles, allowing the photocatalyst to highly dispense on the honeycomb 28. Therefore, the required photocatalyst loading can be achieved by a single spray or dip process of the homogenized suspension. Additionally, the photocatalytic coating has good adhesion performance. When the suspension is sprayed on the honeycomb 28, the tungsten oxide/titanium dioxide photocatalyst is highly dispersed over the honeycomb 28 and only a single coating process is required to deposit the required minimum photocatalytic loading.

The homogenizing process has a significant effect on the weight loading and the overall performance of the photocatalytic coating 40. The loading of the tungsten oxide/titanium dioxide photocatalytic coating 40 is in the range of 0.1 mg/cm$^2$ to 1.7 mg/cm$^2$, or equivalently the photocatalytic coating 40 has a thickness of 1 to 20 microns. Preferably, the tungsten oxide/titanium dioxide photocatalytic coating 40 has a loading of in the range of 0.5 mg/cm$^2$ to 1.0 mg/cm$^2$, or equivalently the photocatalytic coating 40 has a thickness of 4 to 8 microns. By employing a single spray or dip coating process, the weight loading is approximately 0.8 mg/cm$^2$, which exceeds the minimum loading of 0.5 mg/cm$^2$ of photocatalystic performance.

During operation of the air purification system 20, the light source 32 is illuminated to activate the tungsten oxide/titanium dioxide photocatalyst coating 40 on the surface of the honeycomb 28. When the photons of the ultraviolet light are absorbed by the tungsten oxide/titanium dioxide photocatalyst coating 40, an electron is promoted from the valence band to the conduction band, producing a hole in the valence band. The tungsten oxide/titanium dioxide photocatalyst coating 40 must be in the presence of oxygen and water to oxidize the contaminants into carbon dioxide, water, and other substances. The electrons that are promoted to the conduction band are captured by the oxygen. The holes in the valence band react with water molecules adsorbed on the tungsten oxide/titanium dioxide photocatalyst coating 40 to form reactive hydroxyl radicals.

When a contaminant in the air is adsorbed onto the tungsten oxide/titanium dioxide photocatalyst coating 40, the hydroxyl radical attacks the contaminant, abstracting a hydrogen atom from the contaminant. In this method, the hydroxyl radical oxidizes the contaminants and produces water, carbon dioxide, and other substances.

Figure 5:
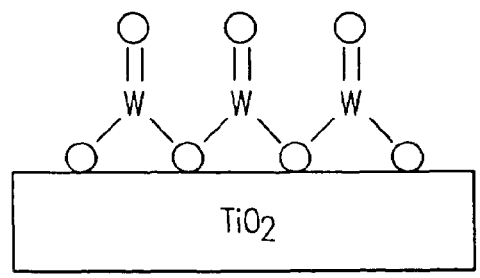
FIG. 5 schematically illustrates a monolayer of tungsten oxide on the titanium dioxide of the photocatalytic coating.

As shown in FIG. 5, the tungsten oxide of the tungsten oxide/titanium dioxide photocatalyst coating 40 is highly dispersed and forms a monolayer on the surface of the titanium dioxide. A separate phase of tungsten oxide is not observed by employing x-ray diffraction and transmission electron microscopy measurements. It is believed that the tungsten oxide is grafted to the surface of the titanium dioxide through the reaction of the ammonium paratungstate $((NH_4)_{10}W_{12}O_{41})$ with the surface hydroxyl groups of the titanium dioxide. The resulting full monolayer of tungsten oxide can entirely cover surface of the titanium dioxide with one atomic thickness or the resulting partial monoloayer of tungsten oxide can partially cover the surface of the titanium dioxide. Higher loadings of tungsten oxide on the titanium dioxide (greater than 6 mol %) can result in multi-layers of tungsten oxide on the surface of the titanium dioxide, making the catalyst less active.

The tungsten oxide species on the titanium dioxide surface modifies the surface properties of the titanium dioxide. For example, the pH of the tungsten oxide/titanium dioxide photocatalyst coating is 1.7, whereas the pH of the titanium dioxide photocatalyst coating is 9.5. Loading the tungsten oxide on the titanium dioxides changes the titanium dioxide from slightly basic to strongly acidic. It is believed that the increase in the surface acidity of the titanium dioxide increases the affinity of the contaminant molecules to the surface of the photocatalyst, therefore increasing the adsorption strength of the photocatalyst. The photocatalytic activity is improved by the enhanced adsorption capability. Additionally, the increase in surface acidity increases the density of hydroxy radical groups on the surface, and therefore provides an increased amount of hydroxyl radicals to facilitate the photocatalytic reaction.

The titanium dioxide of the photocatalytic coating 40 contains the rutile crystal phase. In one example, the titanium dioxide of the photocatalyst coating 40 includes approximately 20% of the rutile crystal phase and approximately 80% of the anatase crystal phase.

The tungsten oxide/titanium dioxide photocatalyst coating 40 of the present invention has high stability to humidity variations which normally occur in HVAC systems. Typically, an HVAC system 14 operates in a humidity range of 10-60% in buildings. The photocatalytic performance of the prior art titanium dioxide coating has been affected by water vapor in air because the water vapor and gaseous contaminants compete for adsorption sites on the titanium dioxide photocatalyst. The tungsten oxide/titanium dioxide photocatalyst of the present invention increases the affinity of contaminants over the water molecules. Therefore, humidity has a decreased effect on the oxidative performance of the tungsten oxide/titanium dioxide photocatalyst coating. Stated another way, the tungsten oxide/titanium dioxide photocatalyst compensates for humidity effects.

Figure 6:
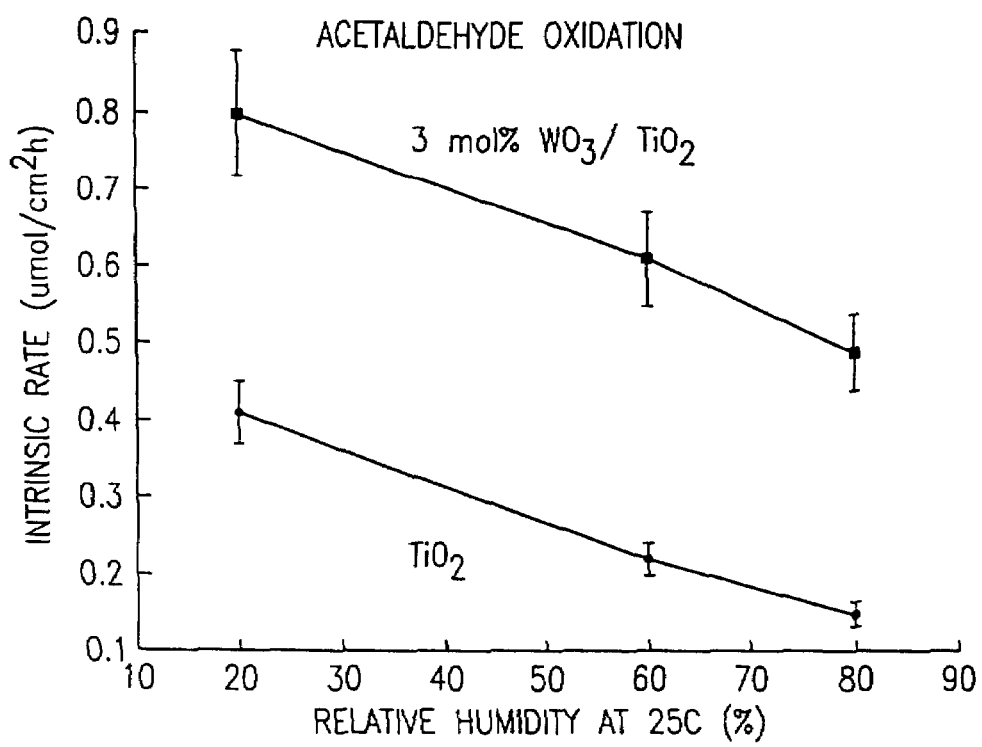
FIG. 6 schematically illustrates a graph illustrating the intrinsic rate of acetaldehyde oxidation as a function of relative humidity.

FIG. 6 illustrates a graph of the intrinsic rate of the oxidation of acetaldehyde as a function of relative humidity. As shown, the oxidation rate of the titanium oxide photocatalyst of the prior art and the tungsten oxide/titanium dioxide photocatalyst of the present invention both decrease with increased humidity. However, the oxidation rate of the tungsten oxide/titanium dioxide photocatalyst is higher than the oxidation rate of the titanium dioxide photocatalyst at all humidity levels. As humidity increases, the photocatalytic activity of the tungsten oxide/titanium dioxide photocatalyst decreases at a rate that is less than the decrease of the photocatalytic activity of titanium dioxide.

Figure 7:
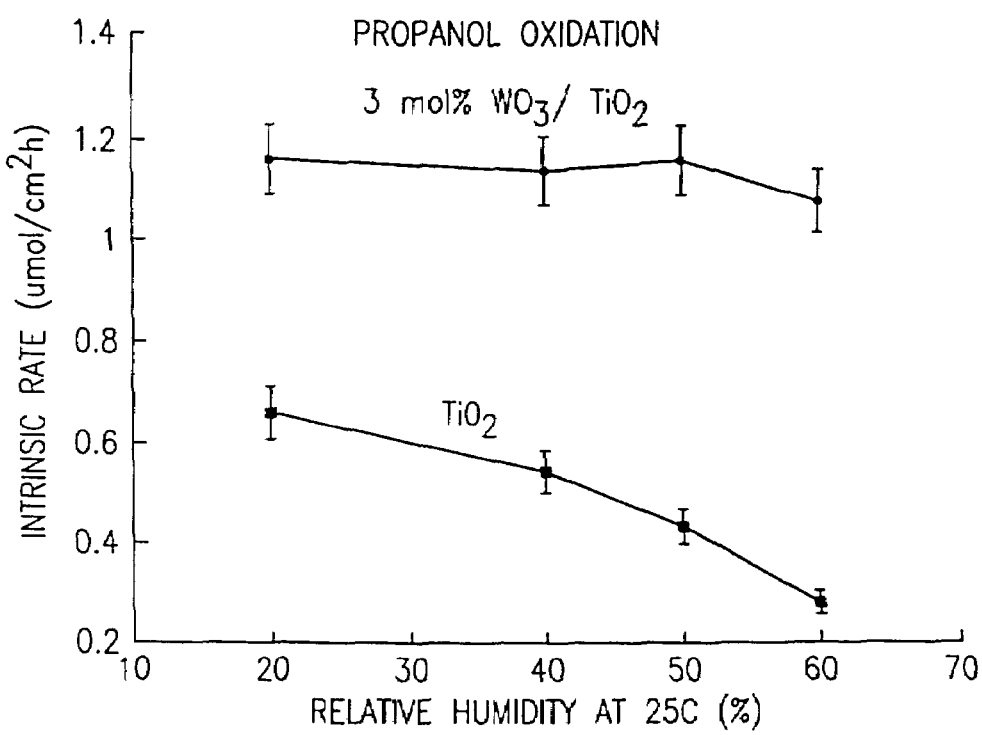
FIG. 7 schematically illustrates a graph illustrating the intrinsic rate of propanal oxidation as a function of relative humidity.

FIG. 7 illustrates a graph of the intrinsic rate of the oxidation of propanal as a function of relative humidity. As shown, humidity does not have a large impact on the oxidation rate of the tungsten oxide/titanium dioxide photocatalyst, and the oxidation rate remains stable as humidity increases. The oxidation rate of the titanium oxide photocatalyst of the prior art decreases with increased humidity. The oxidation rate of the tungsten oxide/titanium dioxide photocatalyst is again higher than the oxidation rate of the titanium dioxide photocatalyst at all humidity levels.

Figure 8:
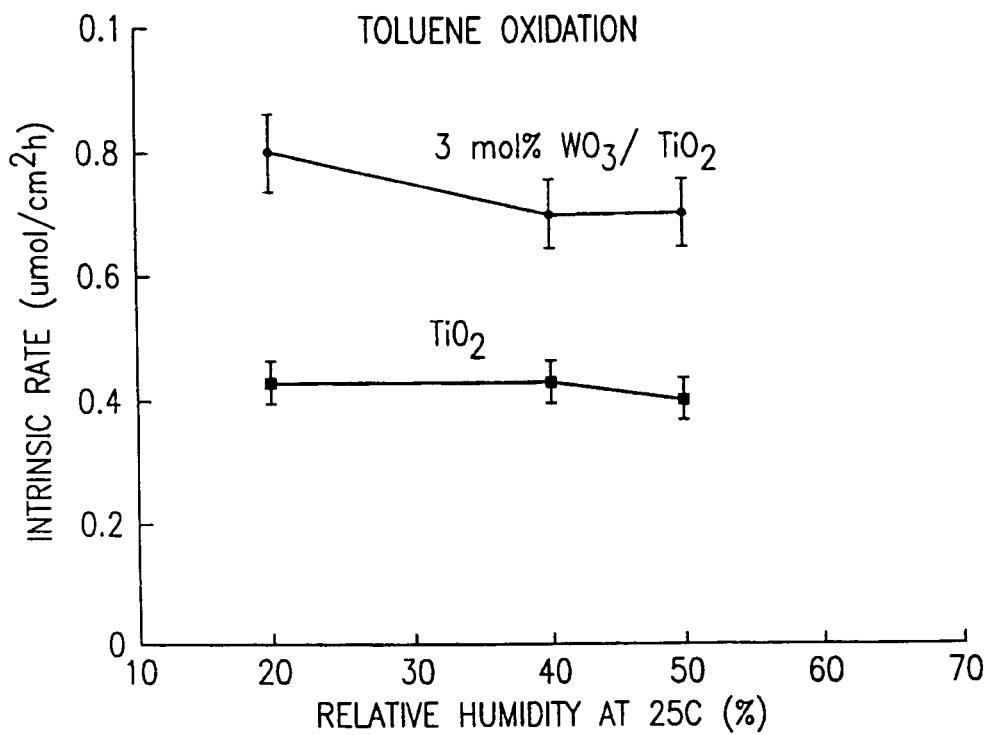
FIG. 8 schematically illustrates a graph illustrating the intrinsic rate of toluene oxidation as a function of relative humidity.

FIG. 8 illustrates a graph of the intrinsic rate of the oxidation of toluene as a function of relative humidity. As shown, humidity also does not have a large impact on the oxidation rate of the tungsten oxide/titanium dioxide photocatalyst, and the oxidation rate remains stable as humidity increases. The oxidation rate of the titanium oxide photocatalyst of the prior art also remains relatively stable with increased humidity. However, the oxidation rate of the tungsten oxide/titanium dioxide photocatalyst is higher than the oxidation rate of the titanium dioxide photocatalyst at all humidity levels.

Figure 9:
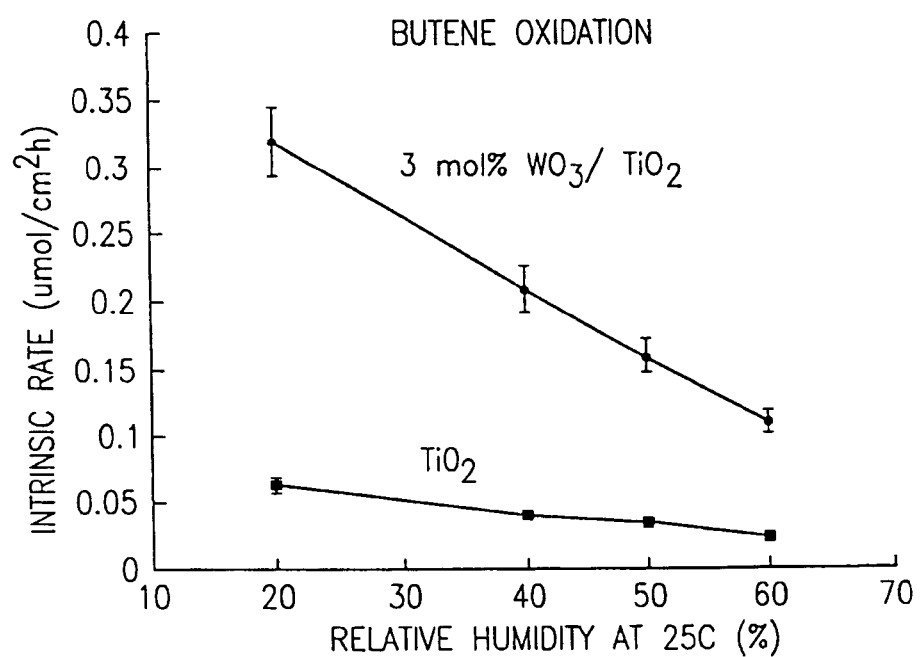
FIG. 9 schematically illustrates a graph illustrating the intrinsic rate of butene oxidation as a function of relative humidity.

FIG. 9 illustrates a graph of the intrinsic rate of the oxidation of butene as a function of relative humidity. As shown, humidity has an impact on the oxidation rate of the tungsten oxide/titanium dioxide photocatalyst, and the oxidation rate decreases with increased humidity. The oxidation rate of the titanium oxide photocatalyst of the prior art also decreases with increased humidity. However, the oxidation rate of the tungsten oxide/titanium dioxide photocatalyst is higher than the oxidation rate of the titanium dioxide photocatalyst at all humidity levels.

Different volumes of the ammonium paratungstate suspension are applied to achieve different loadings of tungsten oxide on titanium dioxide in the resulting photocatalyst. In one example, 6.396 g of titanium dioxide is added separately to 100 ml, 300 ml and 500 ml of the suspension containing approximately 2.0 mg/ml of ammonium paratungstate. Correspondingly, a series of tungsten oxide loadings of 1 mol %, 3 mol % and 5 mol % can be achieved in the resulting tungsten oxide/titanium dioxide photocatalyst.

Figure 10:
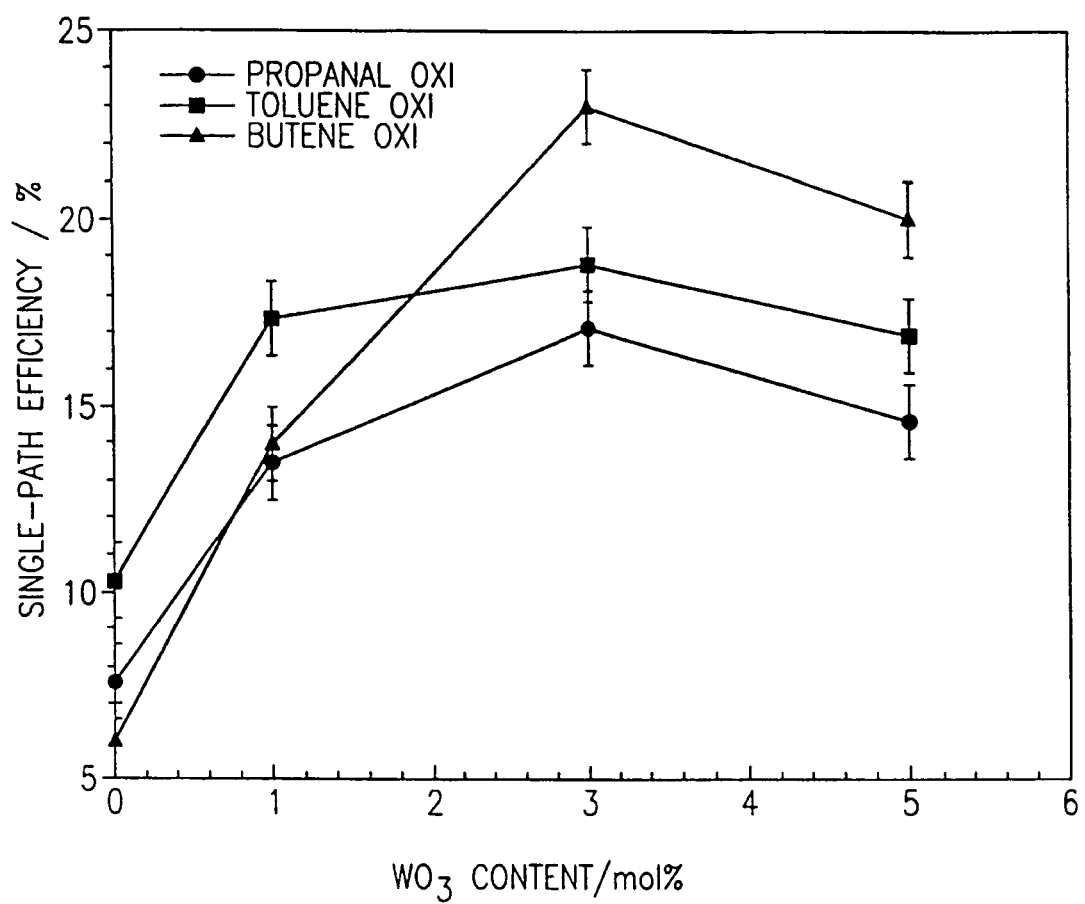
FIG. 10 schematically illustrates a graph illustrating the efficiency of the photocatalyst of the present invention as a function of the mol content of tungsten oxide.

FIG. 10 illustrates a graph of efficiency of the photocatalyst as a function of tungsten oxide content. As shown, for the oxidations of propanal, toluene and butene, the tungsten oxide/titanium dioxide photocatalytic coating has the highest efficiency when the tungsten oxide has a concentration of approximately 2 to 4 mol %. When employing a 3 mol % tungsten oxide/titanium dioxide photocatalyst, the tungsten oxide/titanium dioxide photocatalyst doubled the intrinsic reaction rate of propanal oxidation over the titanium dioxide photocatalyst of the prior art. There is an 80% increase in the intrinsic reaction rate of toluene oxidation over the titanium dioxide photocatalyst of the prior art. The intrinsic reaction rate of butene oxidation is tripled over the titanium dioxide photocatalyst of the prior art.

Although a honeycomb 28 has been illustrated and described, it is to be understood that the tungsten oxide/titanium dioxide photocatalytic coating 40 can be applied on any structure. The voids in a honeycomb 28 are typically hexagonal in shape, but it is to be understood that other void shapes can be employed. As contaminants adsorb onto the tungsten oxide/titanium dioxide photocatalytic coating 40 of the structure in the presence of a light source, the contaminants are oxidized into water, carbon dioxide and other substances.

The effective efficiency for an air purifier operating on indoor air that is contaminated by a contaminant j is defined as:

$$\eta_{\mathit{eff}}=1-(\Sigma C_j^o/\Sigma C_j^i)=1-(\Sigma C_j^o/C_T) \quad \text{(Equation 1)}$$

where $\Sigma C_j^i$ and $\Sigma C_j^o$ represent the sum of contaminant concentrations into and out of the reactor, respectively.

The effectiveness of an air purifier can be written as the sum of the efficiencies for each species in the air weighted by the contaminant mole fraction $X_j$ of that species:

$$CADR_{\mathit{eff}}=CADR_1X_1+CADR_2X_2+CADR_3X_3+\ldots \quad \text{(Equation 2)}$$

A catalyst for air purification needs to be effective for all species in the air as described in Equation 2, or more importantly for all the species in the air important to air quality. The mole fraction X can be replaced with a weighting factor Z which represents the importance of that species to the overall indoor air quality. In this case, Equation 2 becomes:

$$CADR_{\mathit{eff}}=CADR_1Z_1+CADR_2Z_2+CADR_3Z_3+\ldots \quad \text{(Equation 3)}$$

One potential AQI weighting factor is the Air Quality Index Z expressed as:

$$Z_j=T_j^i/AQI^i \quad \text{(Equation 4)}$$

where T is the contribution of the individual species j to the overall index, AQI.

The importance in defining air purification performance is demonstrated in the current invention where catalyst performance is a weighted sum for many species of importance to indoor air quality, and not just one species.

The photocatalytic coating 40 of the present invention improves the effective clean air delivery rate of the air purification system 20. Additionally, as the photocatalytic coating 40 has high stability to humidity variations, there is less of a detrimental effect on the effective clean air delivery rate due to humidity.

There are several advantages to the tungsten oxide/titanium dioxide photocatalyst of the present invention. For one, the tungsten oxide/titanium dioxide photocatalyst is highly active, greatly increasing the intrinsic reaction rate of contaminants over the prior art titanium dioxide photocatalyst. Additionally, the tungsten oxide/titanium dioxide photocatalyst has high stability to humidity variations in a HVAC system. Finally, the coating method is cost effective as only one cycle of spraying of dipping process is required to deposit a minimum loading of 0.5 mg/cm² onto the honeycomb 28.

The foregoing description is only exemplary of the principles of the invention.

Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An air purification system comprising:
   a substrate;
   a metal oxide/titanium dioxide photocatalytic coating including a monolayer of tungsten oxide on titanium dioxide, the monolayer of tungsten oxide having a thickness no greater than one molecular unit, and said photocatalytic coating is applied on said substrate; and
   a light source to activate said tungsten oxide/titanium dioxide photocatalytic coating, and said tungsten oxide/titanium dioxide photocatalytic coating oxidizes contaminants in an air flow that are adsorbed onto said tungsten oxide/titanium dioxide photocatalytic coating when activated by said light source.

2. The air purification system as recited in claim 1 wherein said substrate is an array of voids separated by a solid.

3. The air purification system as recited in claim 2 wherein said substrate is one of aluminum and an aluminum alloy.

4. The air purification system as recited in claim 2 further including a plurality of substrates and a plurality of ultraviolet light sources, and said plurality of substrates and said plurality of ultraviolet light sources alternate.

5. The air purification system as recited in claim 1, further including a particle filter to block dust in said air flow.

6. The air purification system as recited in claim 1 further including a fan that draws said air flow into said air purification system.

7. The air purification system as recited in claim 1 further including a housing, the coated substrate and light source are in said housing, and said housing is lined with a reflective material.

8. The air purification system as recited in claim 1 wherein said light source is an ultraviolet light source.

9. The air purification system as recited in claim 8 wherein said ultraviolet light source generates light in the range of 180 nanometers to 400 nanometers.

10. The air purification system as recited in claim 1 wherein said coating has a loading between 0.01 mg/cm$^2$ and 1.7 mg/cm$^2$.

11. The air purification system as recited in claim 1, further comprising a HVAC system that includes said substrate, said metal oxide/titanium dioxide photocatalytic coating, and said light source.

12. The air purification system as recited in claim 1 wherein titanium dioxide of said tungsten oxide/titanium dioxide photocatalytic coating contains a rutile crystal phase.

13. The air purification system as recited in claim 1 wherein said monolayer of tungsten oxide entirely covers said titanium dioxide.

14. An air purification system comprising:
a substrate;
a metal oxide/titanium dioxide photocatalytic coating including monolayer tungsten oxide on titanium dioxide, and said photocatalytic coating is applied on said substrate, wherein said monolayer of tungsten oxide partially covers said titanium dioxide; and
a light source to activate said tungsten oxide/titanium dioxide photocatalytic coating, and said tungsten oxide/titanium dioxide photocatalytic coating oxidizes contaminants in an air flow that are adsorbed onto said tungsten oxide/titanium dioxide photocatalytic coating when activated by said light source.

15. An air purification system comprising:
a container having an inlet and an outlet;
a porous substrate inside said container;
a device for drawing a fluid into said container through said inlet, flowing said fluid through said porous substrate, and expelling said fluid out of said container through said outlet;
a tungsten oxide/titanium dioxide photocatalytic coating including a monolayer of tungsten oxide on titanium dioxide, the monolayer of tungsten oxide having a thickness no greater than one molecular unit, and said tungsten oxide/titanium dioxide photocatalytic coating is applied on said porous substrate; and
an ultraviolet light source to activate said photocatalytic coating, and photons from said ultraviolet light source are absorbed by said tungsten oxide/titanium dioxide photocatalytic coating to form a reactive hydroxyl radical, and said reactive hydroxyl radical oxidizes contaminants in said fluid that are adsorbed onto said tungsten oxide/titanium dioxide photocatalytic coating when activated by said light ultraviolet light source to water and carbon dioxide in the presence of water and oxygen.

16. A method of purifying air comprising the steps of;
applying a monolayer of tungsten oxide on titanium dioxide to produce a photocatalytic coating on a substrate, the monolayer of tungsten oxide having a thickness no greater than one molecular unit;
activating said tungsten oxide/titanium dioxide photocatalytic coating;
forming a reactive hydroxyl radical;
adsorbing contaminants in an air flow onto said tungsten oxide/titanium dioxide photocatalytic coating; and
oxidizing said contaminants with said hydroxyl radical.

17. The method as recited in claim 16 wherein said contaminants are at least one of an oxidizable species and a reducible species.

18. The method as recited in claim 16 wherein said oxidizable species is carbon monoxide and said reducible species is ozone.

19. The method as recited in claim 17 wherein said contaminants are at least one of toluene, propanal, butene, acetaldehyde, and mixtures thereof.

20. The method as recited in claim 17 wherein said contaminants are one of volatile organic compounds and semi-volatile organic including at least one of aldehyde, ketone, alcohol, aromatic, alkene, and alkane.

21. The method as recited in claim 16 wherein said step of activating said photocatalytic coating includes illuminating an ultraviolet light source.

22. The method as recited in claim 16 wherein the step of oxidizing said contaminants includes oxidizing said contaminants to water and carbon dioxide.

23. The air purification system as recited in claim 1 wherein said monolayer of tungsten oxide comprises less than 6 mol % of said photocatalytic coating.

24. The air purification system as recited in claim 1 wherein said metal oxide/titanium dioxide photocatalytic coating comprises a pH about 1.7.

25. The air purification system as recited in claim 1 wherein said monolayer of tungsten oxide on titanium dioxide is a reaction product of ammonium paratungstate and titanium dioxide.

26. The air purification system as recited in claim 1 wherein said titanium dioxide comprises approximately 20% of the rutile crystal phase and approximately 80% of the anatase crystal phase.

27. The air purification system as recited in claim 1 wherein said coating has a loading between 0.5 mg/cm$^2$ and 1.0 mg/cm$^2$.

* * * * *